United States Patent
Otte et al.

(10) Patent No.: US 9,810,867 B2
(45) Date of Patent: Nov. 7, 2017

(54) CONNECTOR ASSEMBLY

(71) Applicant: FCI Asia PTE. LTD., KA Place (SG)

(72) Inventors: Sven Otte, Berlin (DE); Jeroen De Bruijn, Loop on Zand (NL)

(73) Assignee: FCI Asia Pte. Ltd., Singapore (SG)

( * ) Notice: Subject to any disclaimer, the term of this patent is extended or adjusted under 35 U.S.C. 154(b) by 0 days.

(21) Appl. No.: 15/026,422

(22) PCT Filed: Oct. 1, 2014

(86) PCT No.: PCT/US2014/058564
§ 371 (c)(1),
(2) Date: Mar. 31, 2016

(87) PCT Pub. No.: WO2015/050948
PCT Pub. Date: Apr. 9, 2015

(65) Prior Publication Data
US 2016/0246021 A1  Aug. 25, 2016

Related U.S. Application Data

(60) Provisional application No. 61/886,368, filed on Oct. 3, 2013.

(51) Int. Cl.
*G02B 6/36* (2006.01)
*G02B 6/42* (2006.01)
*G02B 6/38* (2006.01)

(52) U.S. Cl.
CPC ......... *G02B 6/4292* (2013.01); *G02B 6/3821* (2013.01); *G02B 6/3893* (2013.01)

(58) Field of Classification Search
None
See application file for complete search history.

(56) References Cited

U.S. PATENT DOCUMENTS 5,074,803 A  12/1991  Chandler et al.
5,580,268 A  12/1996  Miyazawa
(Continued)

OTHER PUBLICATIONS

International Search Report and Written Opinion for International Application No. PCT/US2014/058564 dated Jan. 8, 2015.
(Continued)

*Primary Examiner* — Sung Pak
(74) *Attorney, Agent, or Firm* — Wolf, Greenfield & Sacks, P.C.

(57) ABSTRACT

In accordance with one embodiment, a connector assembly, for instance a connector assembly for an optical waveguide, includes a dielectric connector housing including a housing body that defines a mating end configured to mate with a complementary connector along a mating direction. The connector assembly further includes at least one latch arm supported by the housing body. The at least one latch arm can define outer surface and an opposed inner surface that faces an outer surface of the housing body. The connector assembly further includes an unlocking element supported by the housing body. The unlocking element can define an inner surface that faces the outer surface of the at least one latch arm. Movement of the unlocking element from a first position to a second position can cause the at least latch arm to deflect from a locked position to an unlocked position.

21 Claims, 8 Drawing Sheets

(56) References Cited

U.S. PATENT DOCUMENTS

| | | | |
|---|---|---|---|
| 7,014,490 B1* | 3/2006 | Morikawa | H01R 13/6275 439/352 |
| 7,081,002 B2* | 7/2006 | de Vanssay | H01R 13/6275 439/350 |
| 7,104,842 B1* | 9/2006 | Huang | H01R 13/65802 439/352 |
| 7,297,013 B2* | 11/2007 | Caveney | H01R 43/26 439/352 |
| 8,360,798 B2* | 1/2013 | Gabrielsson | H01R 13/6335 439/352 |
| 9,391,408 B2* | 7/2016 | Katayanagi | H01R 13/6582 |
| 9,431,772 B2* | 8/2016 | Gao | H01R 13/6597 |
| 2004/0087206 A1 | 5/2004 | Grubbs | |
| 2010/0062635 A1 | 3/2010 | Jones, Jr. et al. | |
| 2012/0294571 A1 | 11/2012 | Kappla et al. | |

OTHER PUBLICATIONS

International Preliminary Report on Patentability for International Application No. PCT/US2014/058564 dated Apr. 14, 2016.

\* cited by examiner

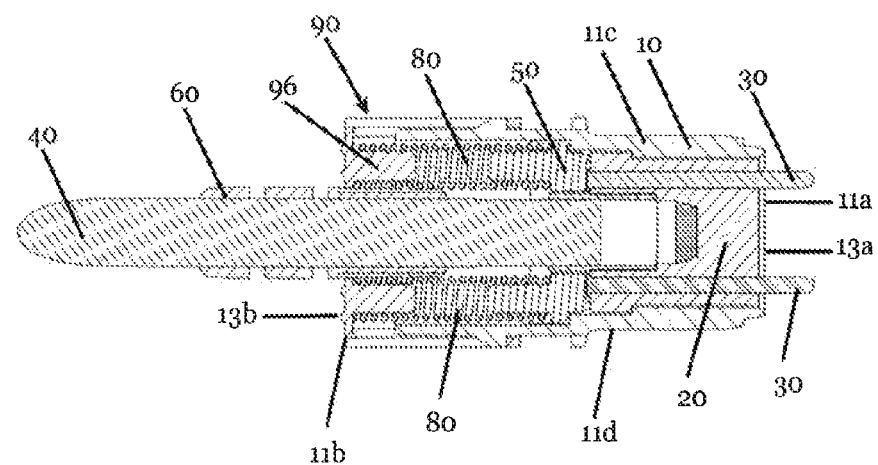
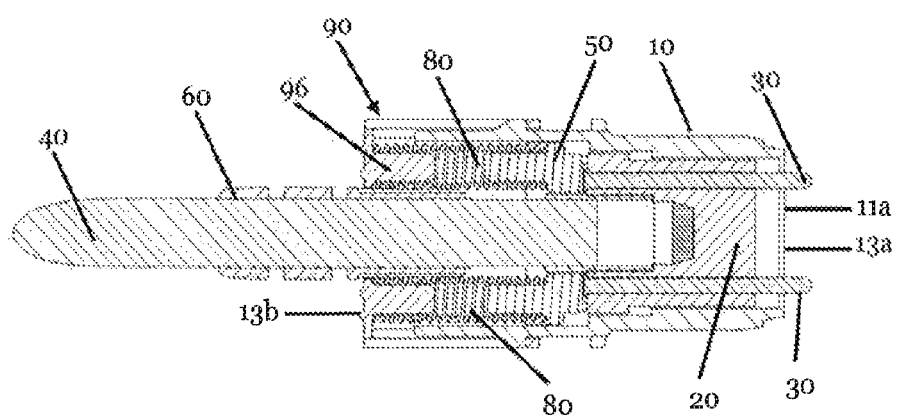
Fig. 2b
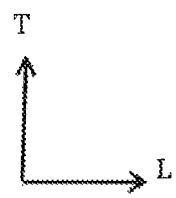

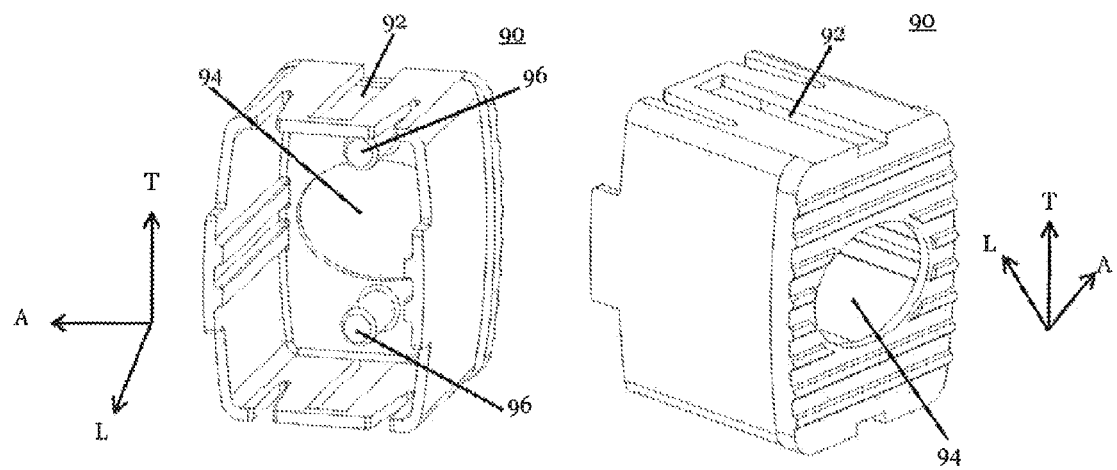
Fig. 3a          Fig. 3b
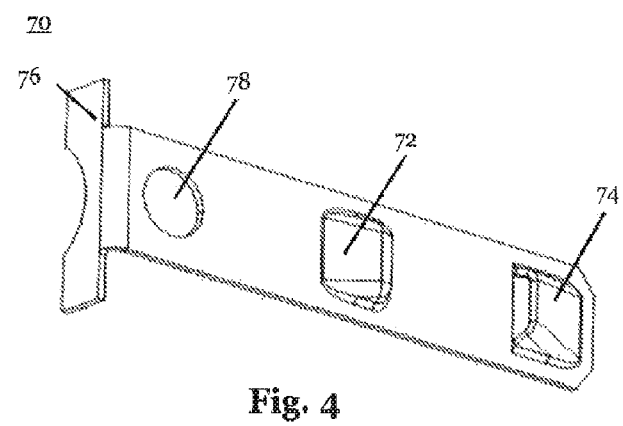
Fig. 4
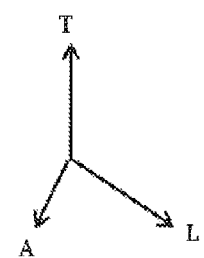

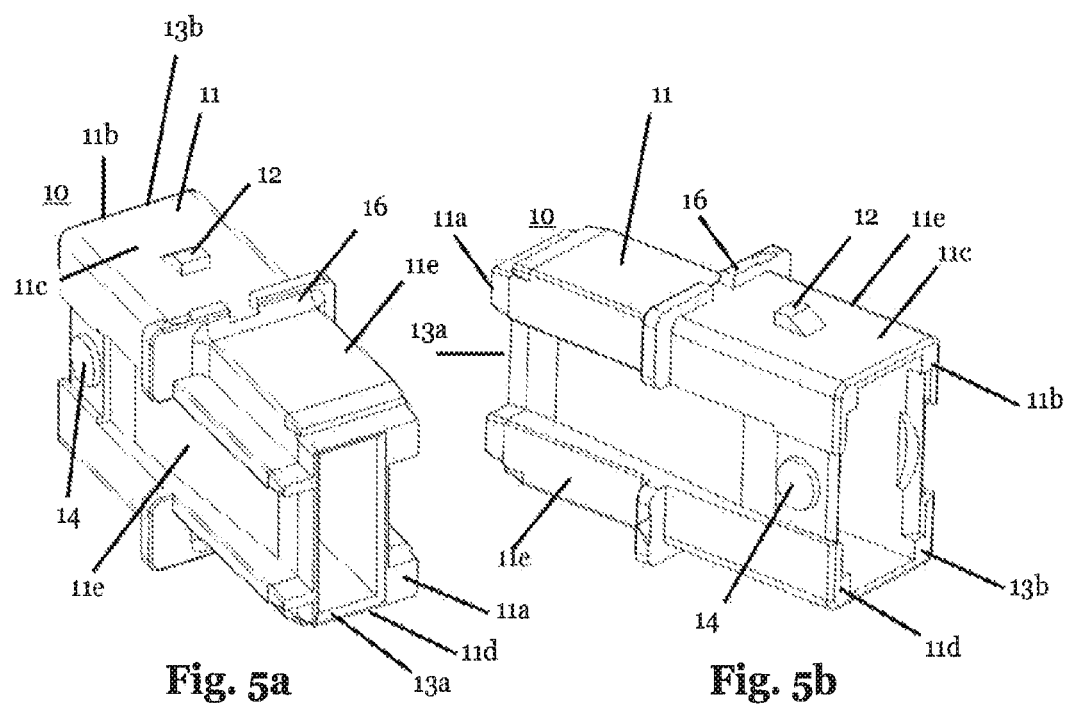

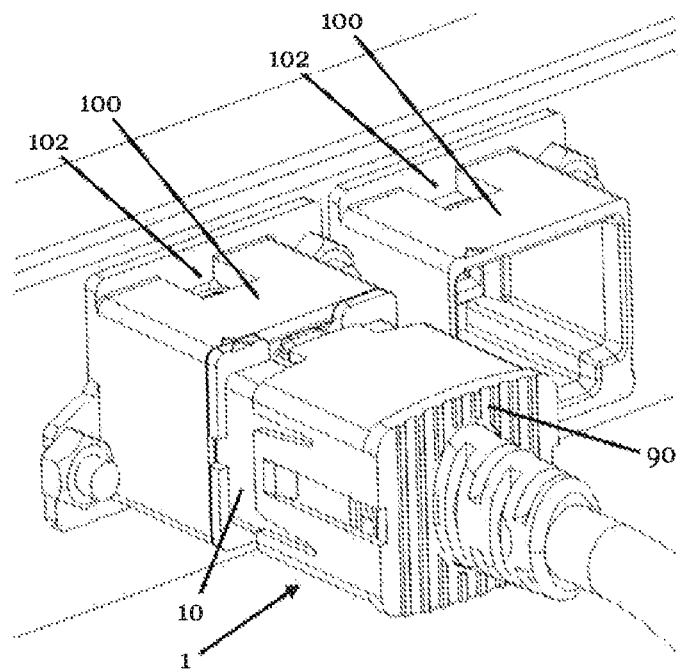
Fig. 8
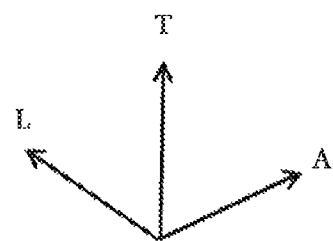

CONNECTOR ASSEMBLY

CROSS-REFERENCE TO RELATED APPLICATIONS

This application is the National Stage of International Application No. PCT/US2014/058564, filed Oct. 1, 2014, which claims the benefit of U.S. application No. 61/886,368, filed Oct. 3, 2013, the disclosures of which are incorporated herein by reference in their entireties.

BACKGROUND

In many electronic applications, it is necessary to connect signal lines, for example optical signal lines, to electronic devices such as other optical signal lines or to printed circuit boards, via terminals. The connection signal lines requires can require specific connector assemblies, in particular if the optical signal line and the corresponding optical connector assembly are each intended to be releasably connectable.

In US 2013/0136402 A1, a re-terminable, no-crimp ST-type optical connector assembly for fiber optics is described, which comprises a bayonet coupling. This bayonet coupling is used to connect the fiber optic connector with a corresponding terminal in a releasable manner. The bayonet-coupling is used to lock the fiber connector at the corresponding terminal, in order to avoid any unintentional unplugging of the fiber optic connector. As described, it is necessary to carry out a rotation of the entire connector or at least of the bayonet coupling of about 60°. Therefore, it is necessary to design the fiber optic connector rotation-symmetrically in order to be able to carry out the above-mentioned rotation. The fiber optic connector of US 2013/0136402 A1 is appropriate to transfer one single optical signal. However, due to the imperatively necessary rotatory-symmetric design of the fiber optic connector, it is not possible to transfer more than one optic signal by the use of the above-described fiber optic connector.

In US 2011/0097044 A1, an optical connector is described that comprises an elastic piece that is inclined upward from the side surface of the frontend portion of the frame body towards a backend portion of the frame body. The elastic piece comprises a tab for a fixation and retention thereof in an appropriately configured port of a patch panel or other device to permit signals to pass from the optical fiber to the device and vice-versa. As it may be seen from the disclosure of US 2011/0097044 A1, the elastic piece protrudes significantly from the frame body and thus is exposed to any lateral forces that may be applied thereon. However, this design leads to a significant risk of a breaking of the elastic piece so that the entire optical connector would have to be replaced.

Existing connector assemblies are not appropriate for transferring more than one optical signal. Moreover, existing connector assemblies are not robust in view of mechanical impacts associated with providing a secure connection with a corresponding counter connector.

SUMMARY

In accordance with one embodiment, a connector assembly, for instance a connector assembly for an optical waveguide, includes a dielectric connector housing including a housing body that defines a mating end configured to mate with a complementary connector along a mating direction. The connector assembly further includes at least one latch arm supported by the housing body. The at least one latch arm can define outer surface and an opposed inner surface that faces an outer surface of the housing body. The connector assembly further includes an unlocking element supported by the housing body. The unlocking element can define an inner surface that faces the outer surface of the at least one latch arm. Movement of the unlocking element from a first position to a second position can cause the at least latch arm to deflect from a locked position to an unlocked position. In one embodiment, the unlocking element is moved in the mating direction to cause a first and second latch arm to deflect toward each other. The connector assembly can be a plug connector configured to be mated with a corresponding socket or terminal of a complementary electrical component.

BRIEF DESCRIPTION OF THE DRAWINGS

The foregoing summary, as well as the following detailed description, will be better understood when read in conjunction with the appended drawings. For the purposes of illustrating the connector assembly of the present application, there is shown in the drawings a preferred embodiment. It should be understood, however, that the application is not limited to the precise arrangements and instrumentalities shown. In the drawings:

FIG. 2a shows an exploded view of the connector assembly shown in FIG. 1a;

FIG. 2b shows two cut views of the connector assembly of FIG. 2a;

FIGS. 3a and 3b show two different 3-dimensional schematic views of the unlocking element in accordance with an example embodiment;

FIG. 4 shows a 3-dimensional schematic view of a deflectable locking portion of the connector assembly shown in FIG. 1a;

FIGS. 5a and 5b show different detailed views of the connector housing shown in FIG. 1a;

FIG. 8 shows a connector system that shows the connector assembly shown in FIG. 1a mated with a corresponding counter connector in accordance with an example embodiment.

DETAILED DESCRIPTION OF ILLUSTRATIVE EMBODIMENTS

Figure 1A:
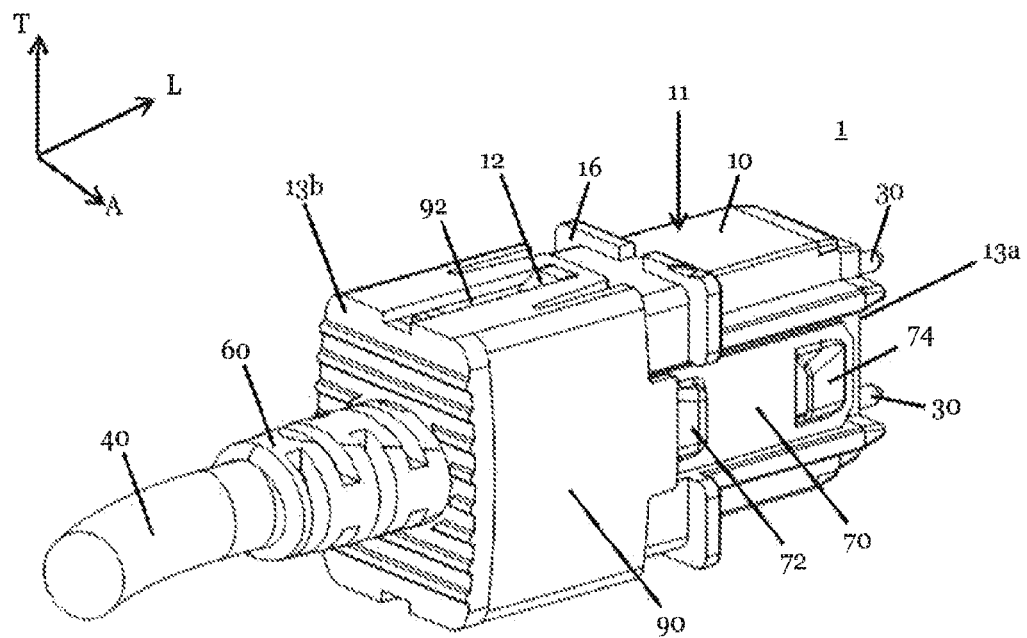
FIG. 1a shows a schematic 3-dimensional illustration of a connector assembly including a connector housing in accordance with one embodiment.

For convenience, the same or equivalent elements in the various embodiments illustrated in the drawings have been identified with the same reference numerals. Certain terminology is used in the following description for convenience only and is not limiting. The words "left," "right," "front," "rear," "upper," and "lower" designate directions in the drawings to which reference is made. The words "forward," "forwardly," "rearward," "inner," "inward," "inwardly," "outer," "outward," "outwardly," "upward," "upwardly," "downward," and "downwardly" refer to directions toward and away from, respectively, the geometric center of the object referred to and designated parts thereof. The terminology intended to be non-limiting includes the above-listed words, derivatives thereof and words of similar import.

Referring to FIGS. 1a to 2b, a connector assembly 1, which can be a connector assembly for an optical wave guide, includes a dielectric connector housing 10 that includes a housing body 11. The housing body 11, and thus the connector assembly 1, can define a mating end 13a configured to mate with a complementary electrical component, for instance a complementary electrical component that includes a socket or terminal 100 (shown in FIG. 8) along a mating direction. The housing body 11 can further define a mounting end 13b opposite the mating end 13a. Referring also to FIGS. 5a and 5b, the housing body 11 defines a front end 11a and an opposed rear end 11b that is spaced from the front end 11a along a longitudinal direction L. The housing body 207 further defines a top end 11c and an opposed bottom end 11d that is spaced from the top end 11c along a transverse direction T that is substantially perpendicular to the longitudinal direction L. The housing body 11 further defines opposed first and second sides 11e that are spaced apart from each other along a lateral direction A that is substantially perpendicular to the longitudinal direction L and the transverse direction T.

Various structures are described herein as extending horizontally along the longitudinal direction "L" and the lateral direction "A" that is substantially perpendicular to the longitudinal direction L, and vertically along the transverse direction "T" that is substantially perpendicular to the longitudinal and lateral directions L and A, respectively. As illustrated, the longitudinal direction "L" extends along a forward/rearward direction of the connector assembly 1, and defines the mating direction along which one or both of the connector housing 10 and a complementary electrical component, such as the terminal 100, are moved relative to the other so as to mate the connector housing 10 with the terminal 100, and thus to mate the connector assembly 1 with the complementary electrical component.

Thus, unless otherwise specified herein, the terms "lateral," "longitudinal," and "transverse" are used to describe the orthogonal directional components of various components. The terms "inboard" and "inner," and "outboard" and "outer" and like terms when used with respect to a specified directional component are intended to refer to directions along the directional component toward and away from the center of the apparatus being described. It should be appreciated that while the longitudinal and lateral directions are illustrated as extending along a horizontal plane, and that while the transverse direction is illustrated as extending along a vertical plane, the planes that encompass the various directions may differ during use, depending, for instance, on the orientation of the various components. Accordingly, the directional terms "vertical" and "horizontal" are used to describe the connector assembly 1 and its components as illustrated merely for the purposes of clarity and convenience, it being appreciated that these orientations may change during use.

In accordance with the illustrated embodiment, the connector assembly 1 is a plug connector assembly configured to mate with a complementary or corresponding socket or terminal of a complementary electrical component along the mating direction, which can thus be referred to as a plug-in direction, so as to establish an optical connection between the connector assembly and the complementary electrical component. It will be understood that the connector assembly can be configured to establish other electrical connections as desired. Further, it will be understood that the connector assembly can be configured as a receptacle connector assembly as desired.

Figure 1B:
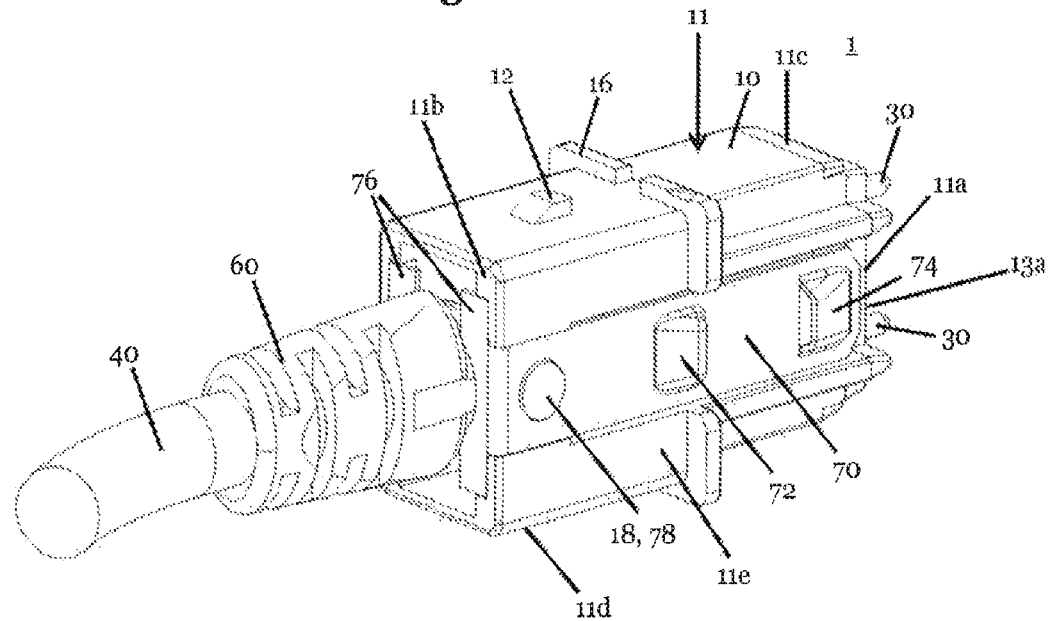
FIG. 1b shows the same view as FIG. 1a with an unlocking element of the connector assembly removed.
Figure 2A:
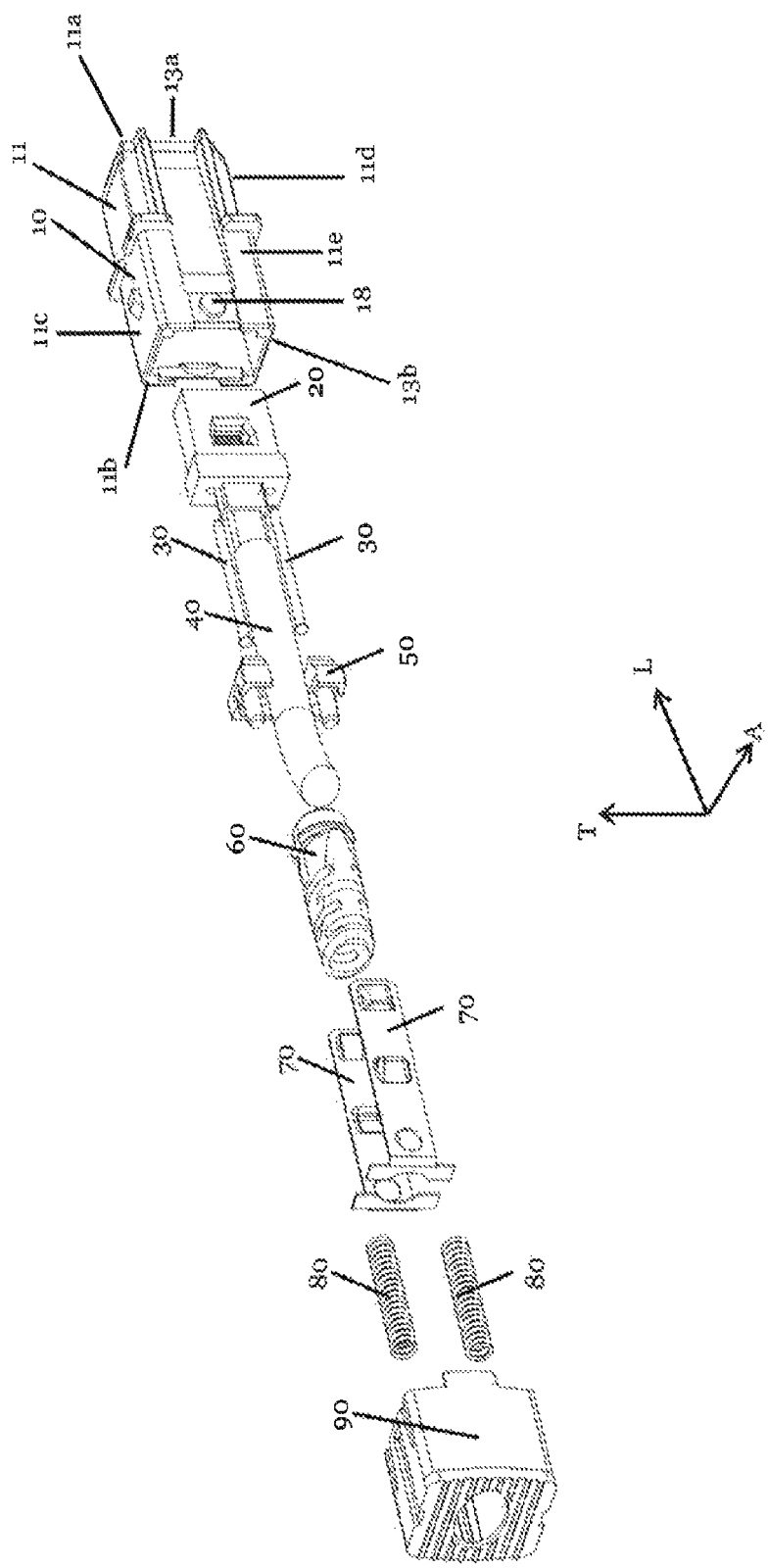

Referring in particular to FIGS. 1b, 2a, and 4, the connector assembly can include at least one deflectable locking portion, for instance at least one latch arm 70, that is supported by the housing body 11. In accordance with the illustrated embodiment, the at least one latch arm 70 includes a first latch arm 70 and a second latch arm 70 spaced from the first latch arm 70 along the lateral direction A that is substantially perpendicular to the mating direction. The latch arms 70 can define an outer surface and an opposed inner surface that faces an outer surface of the housing body. For instance, in accordance with the illustrated embodiment, the inner surface of first latch arm 70 faces the outer surface of one of the sides 11e of the housing body 11, and the inner surface of the second latch arm 70 faces the outer surface of the other one of the sides 11e of the housing body 11. As described further below, the latch arms 70 can serve to releasably lock the connector housing 10 with a terminal, for instance the terminal 100, of a complementary electrical component. The first and second arms 70 can extend in the mating direction of the connector housing 10 so as to be elongate along the mating direction. The latch arms 70 can be disposed on opposite sides 11e of the housing body 11, and thus can be disposed on opposite sides of the connector housing 10. The first and second latch arms 70 can be arranged on opposite sides of the connector housing 10 so as to provide an increased fixation force for the connector assembly 1 in the terminal 100. The arrangement of the latch arms 70 on opposite sides of the connector housing 10 can also help to center connector assembly 1 inside the terminal 100 by providing generally equal opposed forces outwardly against opposed walls of the terminal 100.

Figure 6A:
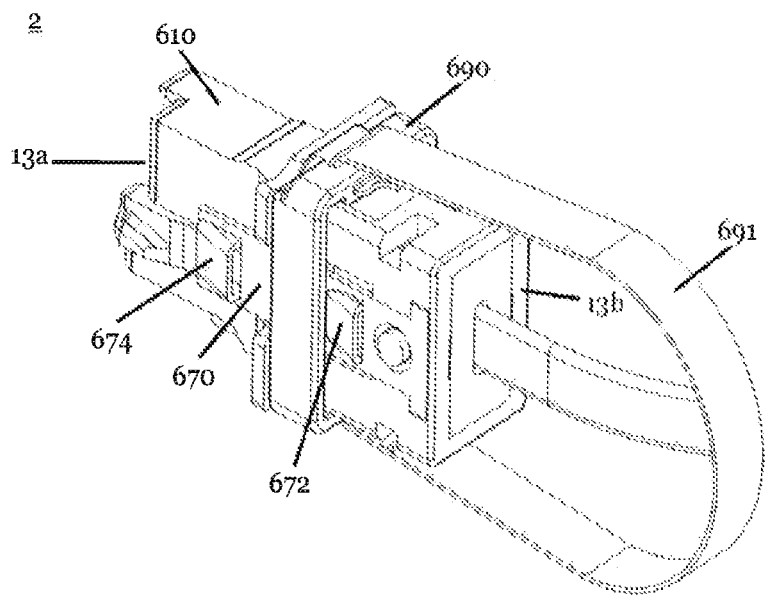
FIGS. 6a and 6b show different parts of another connector assembly in accordance with another embodiment.
Figure 6B:
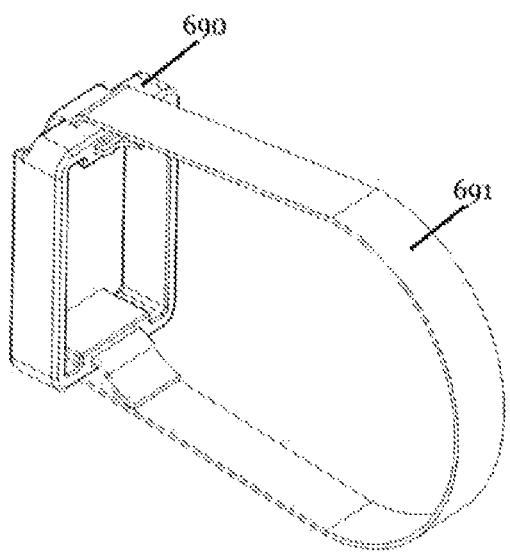

Referring also to FIGS. 3a and 3b, the connector assembly 1 can further include an unlocking element 90. The unlocking element can be supported by the housing body 11, and can be moveable with respect to the connector housing 10 between a first position and a second position. The unlocking element 90 defines an inner surface that faces the outer surface of the at least one latch arm 70. Thus, as further described below, movement of the unlocking element 90 from the first position to the second position can cause the at least one latch arm 70 to deflect from a locked position to an unlocked position. The movement of the unlocking element 90 from the first position to the second position can be along the longitudinal direction L, which is along the mating direction in accordance with the illustrated embodiment. Thus, unlocking element 90 can be configured a slider that is able to slide along a specific track, for instance along the mating direction of the connector assembly 1. In accordance with the illustrated embodiment, the first position can be disposed closer to the mating end 13a as compared to the second position. Alternatively, as described below with reference to FIGS. 6a and 6b, the second position can be disposed closer to the mating end as compared to the first position. Accordingly, in some embodiments the unlocking element can be pressed towards the terminal in order to unlock the connector assembly. In other embodiments, the unlocking element is pulled in the direction away from the terminal in order to unlock the connector assembly. Thus, the user can be provided with appropriate solutions for any connection task, for instance push or pull applications as desired.

The unlocking element 90 can be formed as a cap with a cylindrical bushing wherein a part of the connector housing 10 is arranged. As shown, the unlocking element 90 can slide over the left half of connector housing 10. For instance, the unlocking element can cover the rear end 11b of the housing body. The unlocking element can be defined such that one or more cables 40 can be received in the opening. The cable 40 can be at least partially surrounded by a cable boot 60. As shown, the unlocking element 90 includes a guidance portion 92 that can guide the movement of the unlocking element 90 along the mating direction. It will be understood that the unlocking element 90 can include any number of guidance portions 92 as desired. Further, though the illustrated guidance portion 92 is disposed at a top end of the unlocking element 90, it will be understood that the guidance portion 92 can be alternatively disposed as desired. The housing 10 can include a block 16, which can be in the form of a flange. In one example, the connector housing can be inserted into the terminal 100 until the terminal 100 contacts the block 16. As shown, the connector assembly 1 can include one or more guide pins 30 that extend beyond the front end 11a of the housing body 11 in the forward direction. The guide pins 30 can be part of an optical MT ferrule 20 assembly, as shown in FIG. 2a.

Now referring in particular to FIGS. 1b and 4, the latch arms 70 (in FIGS. 1a and 1b only one latch arm 70 is visible due to the perspective) can each include a locking portion, such as a locking protrusion or tab 74. The latch arms 70 can further include an unlocking portion, such as an unlocking protrusion or push tab 72. In an example embodiment, the movement of the unlocking element 90 from the first position to the second position can cause the inner surface of the unlocking element 90 to ride along the push tab 72. For instance, the inner surface of the unlocking element 90 can abut the push tab 72 when the unlocking element 90 is in the second position. The latch arms 70 can each include at least one locking tab 74 that is supported by the outer surface of the respective latch arm 70. The locking tab 74 can define a ramp such that the ramp rises along a rearward direction, which can be defined as a direction opposite the mating direction of connector assembly 1. Stated another way, the locking tab 74 can define a height measured along the lateral direction A that is substantially perpendicular to the mating direction, and the height can increase in a direction defined from the mating end 13a to the rear end 11b, which is the mounting end 13b in accordance with the illustrated embodiment. Thus, the locking tab 74 can define a smaller height proximate to the mating end 13a as compared to a height proximate to the mounting end 13b. The locking tab 74 can define stops abruptly in the form of a cliff, and thus the locking tab 74 can define a rear side that is perpendicular the sides 11e of the housing body. Thus, the locking tab 74 can define a mechanic form-locking connection, which can highly reliable in the matter of undesired unplugging.

The latch arms 70 can each include at least push tab 72 that is supported by the outer surface of the respective latch arm 70. The push tab 72 can be disposed rearwardly from the locking tab 74 along the longitudinal direction L. The push tab 72 can define a ramp such that the ramp rises along the forward direction, which can be the mating direction of the connector assembly 1 in accordance with the illustrated embodiment. Stated another way, the push tab 72 can define a height measured along the lateral direction A that is substantially perpendicular to the mating direction, and the height can increase in a direction defined from the rear end 11b to the front end 11a of the housing body 11. The latch arms 70 can include latch hooks 76 that are attached to the rear end 11b of the housing body to define a hinge at the rear end 11b of the housing body 1. For instance, the connector housing 10 can define the mounting end 13b opposite the mating end 13a, and the latch arms 70 can be hinged to the connector housing 10 proximate to the mounting end 13b. The latch arms 70 can also define latch holes 78 disposed between the latch hooks 76 and the push tab 72 along the longitudinal direction L. The connector housing 10 can include one or more latch pegs 18 that are received by respective latch holes 78. The latch pegs 18 can be monolithic with the housing body 11.

Thus, in operation, the first and second latch arms 70 can be elastically deflectable about the hinge so that during insertion of the connector housing 10 into a corresponding electrical component, for instance the terminal 100, the latch arms 70 can bend towards each other, for instance when the locking tabs 74 come into contact with corresponding walls of the complementary component. When the connector assembly 1 is fully mated, the latch arms 70 can spring elastically back to their original position, and the locking tabs 74 can engage or latch behind a corresponding undercut or recess provided in the complementary component.

The unlocking element 90 can be moved from the first position (shown in FIG. 1a) to a second position that is forward along the longitudinal direction from the first position. When the unlocking element is in the second position, the inner surface of the unlocking element 90 can engage the push tabs 72 such that the at least latch arms 70 are deflected inwardly. Thus, the movement of the unlocking element 90 can cause the first and second latch arms 70 to deflect toward each other. Further, the connector housing 10 can define a cavity, and the movement of the unlocking element 90 can cause the latch arms 70 to deflect at least partially into the cavity. Thus, it will be appreciated that the latch arms 70 can be placed in the unlocked position when the unlocking element 90 is in the second position, and the connector housing 10 can be disengaged from the complementary electrical component, for instance the terminal 100, when the latch arms 70 are in the unlocked position. Further, the latch arms 70 can deflect a direction that is perpendicular to the mating direction, which can be referred to the plug-in direction. Thus, the latch arms 70, because they are received at least partially in the cavity, can be protected during mating and unmating, which can also be referred to as plug-in and unplug-procedures, respectively.

As shown, the latch arms 70 are hinged to the connector housing 10 proximate to the mounting end 13b, which can also be referred to as a cable end in accordance with the illustrated embodiment, of the connector housing 110. Further, the latch arms 70 define a free distal end proximate to the mating end 13a. Thus, the connector housing 10 can include the mating end 13a and the mounting end 13b opposite the mating end 13a, and the at least one latch arm 70 can be hinged to the connector housing near the mating end 13a and unhinged near the mating end 13a. Thus, a portion of the latch arm 70 that can be received by terminal 100 can be deflected. The arms 70 can be hinged in a static manner to the connector housing 10 so that the deflection is at a maximum at the mating end 13a and decreases toward the mounting end 13b.

Referring in particular to FIG. 2a, the connector assembly can include a spring element, for instance one or more compression springs 80, that can be at least partially disposed inside of the connector housing 10. The unlocking element 90 can include one or more guide pegs 96 supported by the inner surface of the unlocking element 90. The guide pegs 96 can be elongate along the mating direction. Each of the springs 80 can be guided by respective guide pegs 96 of the unlocking element 90 and corresponding guide pegs provided on a spring retainer 50. The spring retainer 50 can interact with the unlocking element 90 to bias the unlocking element 90 in the first position shown in FIG. 1*a*. Thus, to unmate the connector assembly 1, in accordance with one example, the unlocking element 90 is pushed in the mating direction (forward) against the force of the springs 80. The springs 80 can be biased such that the unlocking element 90 cannot be moved unintentionally into the second position, which corresponds to the unlocking position. This process is depicted in FIG. 2*b*, wherein the assembly 1 of FIG. 2*a* is shown in an assembled condition. The upper illustration of FIG. 2*b* shows the connector assembly 1 in an example unmated position. Thus, the springs 80 are less than fully compressed, for instance not compressed. In the lower illustration of FIG. 2*b*, the connector assembly 1 is shown in an example mated position. Thus, the springs 80 are at least compressed more than the springs 80 are compressed in the unmated position. As shown in FIG. 2*b*, the springs 80 can be guided, for instance held in place, by the guide pegs 96 of the unlocking element 90 and the spring retainer 50. The compression of the springs 80 in the mated position can be caused by the MT-ferrule 20, which can engage a front portion of spring retainer 50 to bias or press the same in the direction of the cable end. Accordingly, the springs 80 likewise can apply a force onto the MT ferrule 20 in the mating direction.

Methods for unmuting can further include moving the unlocking element from a first position to a second position along a mating direction, and during the moving step, causing the first and second latch arms to deflect toward each other until the first and second latch arms are in an unlocked position. The method can further include removing a force that moved the unlocking element from the first position to the second position such that the unlocking element returns to the first position.

Thus, the connector assembly 1 further can include a spring element, such as coil springs or compression springs for example, that bias the unlocking element 90 into the first position. The spring element can press the ferrule assembly against a portion of the terminal 100 and can bias the unlocking element 90 into the first position. It is recognized that in the prior art springs are sometimes included in connector assemblies. However, the springs are often fixed to the cable end of the connector housing and only press in one direction. As described above, the same spring can also press against the unlocking element 90 from inside the connector housing 10, thus the movable unlocking element 90 can replace the fixed support of the spring as above described in the context of the prior art.

Referring now to FIG. 3*a*, the unlocking element 90 can include a cable outlet 94 configured to receive the cable 40. The unlocking element 90 can define a box or cup-shape that forms a cylindrical bushing such that the unlocking element 90 can be slid over the connector housing 10. The guide pegs 96 that can be sized so as to hold and guide the springs 80 can be disposed within a cavity defined by the unlocking element 90. The guide pegs 96 can be supported by the inner surface of the unlocking element 90. The spring member, for instance the springs 80, can be held by the guide pegs so as to bias the unlocking element 90 in the first position with respect to the connector housing 10, thereby biasing the at least one latch arm 70 in the locked position.

Referring now to FIG. 4, the latch arms 70 can be separately attached to the connector housing. Thus, the latch arms 70 can be manufactured from a different material than the connector housing 10. It will be understood that the latch arms 70 can manufactured from a suitable material, for instance a spring steel, that achieves any elastic deflectability as desired. Further, the latch arms 70 can composed of a different material than the connector housing 10. For instance, the latch arms 70 can be manufactured from a metal that ensures that the connector assembly can be frequently mated and unmated without the latch arms degrading. The latch arms 70 can be mounted to the connector housing 10 by attaching the latch hook 76 to the connector housing 10. Further, the latch pegs 18 can be received by the latch holes 78 so as secure the latch arms 70 to the sides 11*e* of the housing body 11. The cable boot 60 and the latch hook 76 can be sized so that the boot 60 and the latch hook do not interfere with each other, as shown. Thus, the latch hook 76 can define a semi-circular surface that can receive a portion of the cable boot 60. Further, the latch hook 76 can be sized so as to allow the cable boot 60 to be rotated, for instance rotated up to 90 degrees as shown in FIG. 1*a*.

Referring in particular to FIGS. 5*a* and 5*b*, the cavity of the connector housing can be sized so as receive the ferrule assembly 20. Thus, the connector housing 10 can be hollow so as to receive the ferrule assembly 20 shown in FIG. 2*b*. As shown, the sides 11*e* that are adjacent to the latch arms 70 can taper toward each other in the mating direction so as to allow an elastic deflection of the first and second latch arms 70 toward each other.

Referring now to FIGS. 6*a-b* and 7*a-b*, connector assemblies 2 and 3 are shown in accordance with other embodiments. In the illustrations of FIGS. 6*a-b* and 7*a-b*, three digit reference numbers are used, wherein the last two digits correspond to the two digit reference numbers of FIGS. 1 to 5, to indicate similar or identical parts. Thus, connector housing 610, line the connector housing 10, can include first and second latch arms 670 mounted on two opposite sides of connector housing 610. Further, the latch arms 670 are hinged to the connector housing 610 at the cable end of the housing and are adapted to be elastically deflectable. In the shown construction, the latch arms 670 (in FIG. 6*a* only one latch arm is visible due to the perspective, the other latch arm is provided on the opposite side in symmetrical fashion) are configured to be deflected inwardly, i.e. towards each other. The latch arms 670 are depicted in the locked position in FIG. 6*a*, which is the position the latch arms 670 are in when the connector assembly is fully mated or inserted into a corresponding counter connector. The latch arms 670 each include a locking tab 674 (locking protrusion) and a push tab 672 (unlocking protrusion). It will be appreciated from FIG. 6*a* that the unlocking element 690 is shown in the first position, and that the unlocking element 690 has to be moved opposite the mating direction, for instance in the rearward direction, in order to release the latch arms 670. In other words, the construction of FIG. 6*a* has the opposite unlocking kinematic than the embodiment of FIGS. 1 to 5. Upon movement of the unlocking element 690 in the rearward direction (shown to the right in FIG. 6*a*) the inner surface of the unlocking element 690 will engage the push tabs 672, whereby the latch arms 670 will be deflected towards each other, so that the latch arms 670 are moved into the unlocked position. In the unlocked position, the locking tabs 674 are not engaged with the corresponding counterpart (e.g., terminal 100) of the counter connector or complementary component and the thus the connector assembly can be removed. To facilitate the unmating process, the unlocking element 690 can include one or more pull strap 691. Thus, by pulling the pull straps 691, the connector housing 610 can be released or unlocked and at the same time the connector housing 610 can be physically removed from the complementary component.

Figure 7A:
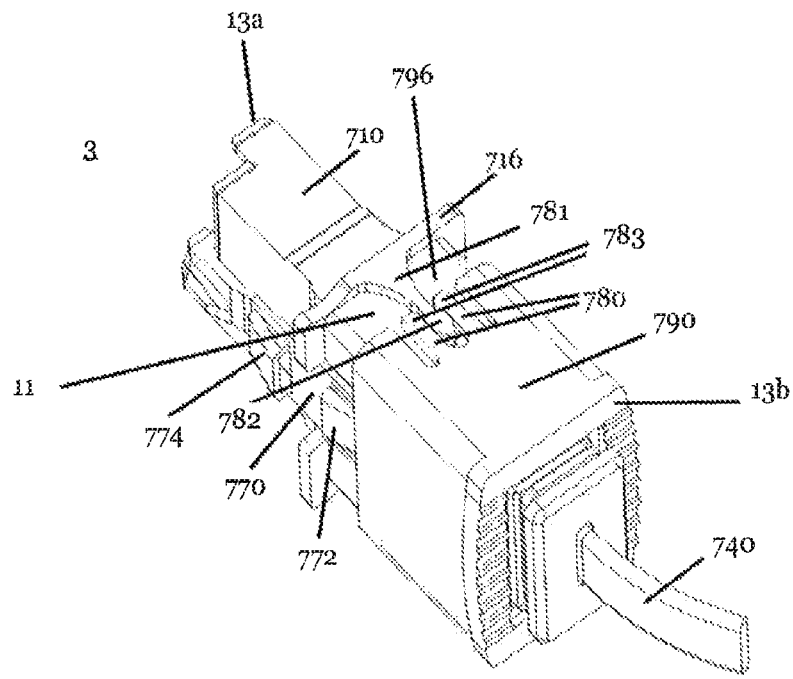
FIGS. 7a and 7b show yet another embodiment of a connector assembly in a 3-dimensional schematic view.
Figure 7B:
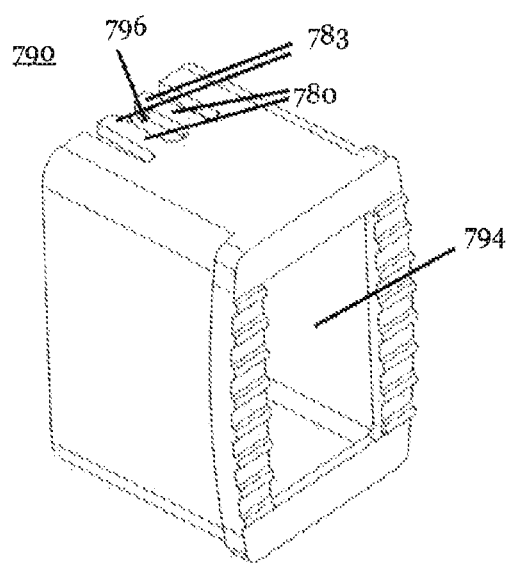

FIG. 7a shows a connector assembly 3 in accordance with another embodiment. As shown, the connector assembly 3 includes a connector housing 710 and an unlocking element 790 that moveably arranged on the connector housing 710. The unlocking element 790 is shown in the first position and is configured to be moved towards the mating end of connector housing 710 into the second position. The skilled person will recognize that the unlocking kinematic of this embodiment is the same as the embodiment shown in FIGS. 1 to 5. Thus, in order to deflect the latch arms 770 into an unlocked position, one has to move the unlocking element 790 towards the mating end 13a. Thus, the unlocking element 790 can be moved in the mating direction of the connector housing 710 to unlock the arms 770. A spring element can bias the unlocking element 790 into the first position. The spring element can be formed by a wedge shaped structure 791 supported by the housing body 11, and a corresponding counterpart. In an example embodiment, the corresponding counterpart can define first and second arms 780 that have a parallel orientation with respect to each other. In accordance with the illustrated embodiment, the unlocking element 790 includes the first and second arms 780 that are spaced from each other along the lateral direction A. The first and second arms 780 are spaced apart from each along the lateral direction A so as to define a slot 796. The slot 796 can be sized so as to receive at least a portion of the wedge-shaped structure 781 along the longitudinal direction L. It will be understood that in an alternative embodiment, the unlocking element 790 can include the wedge shaped structure 791 and the connector housing 710 can include the first and second arms 780. As shown, the wedge shaped structure 781 can be configured to be wedged between the two parallel latch arms 780 when the unlocking element 790 is attached to connector housing 710. Thus, as shown, the wedge shaped structure 781 and the arms 793 can be sized so as to bias the unlocking element 790 into the first position shown in FIG. 7a. Upon movement of the unlocking element 790 into the second position, the first and second latch arms 780 can move along opposed sides of the wedge-shaped structure 781 such that the arms 780 are bent away from each other. Thus, a return force can be created, which can bias the unlocking element 790 back into the first position. It will be understood that the above-described construction can further prevent an unintentional release or unlocking of the connector housing 710. The wedge shaped structure and the arms can be collectively referred to as a spring element. Thus, the aforementioned spring element of this embodiment can be provided instead of, in addition to, springs 80 described above. Further, the at least one spring element can include the first and second arm 780 spaced apart from each other along the lateral direction so as to define the slot 796, and the wedge-shaped structure 781 can be at least partially received by the slot 796 such that wedge-shaped structure 781 causes the first and second arms 780 to bend away from each other as the unlocking element 790 is moved from the first position to the second position.

The wedge-shaped structure 781 can include a hook element 782 that can be disposed at a rearward most tip of the structure 781. The first and second latch arms 780 can include counter portions 783 configured to engage the hook element 782, so that the unlocking element 790 is releasably fixed onto the connector housing 710 in the state shown in FIG. 7a. Thus, in operation, the unlocking element 790 can be moved back and forth from the first to the second position, but it cannot unintentionally be removed from the connector housing 710. Further, the tip of the wedge-shaped structure 781 can prevent the unlocking element 790 from being pushed too far in the mating direction, which might otherwise damage or break the latch arms 780. Thus, in accordance with the above-described embodiment, the spring element may be provided by the connector housing or the unlocking element itself such that that no additional component (e.g., a metal spring) is necessary in some cases. Accordingly, the number of parts in the connector assembly can be reduced. Further, providing a spring force by way of the wedge-shaped structure and the arms may be particularly appropriate if no pressure force is needed to press the ferrule against a portion of the terminal, for instance if the portion of the terminal is pressed by the terminal against the connector assembly in the mated position.

FIG. 8 shows the connector assembly 1 in an example fully mated position with terminal 100 of the complementary electrical component. The terminal 100 can include one more or more recesses (only one visible in FIG. 8 due to the perspective) 102, to provide a corresponding counter portion for the locking tabs 74 of the latch arms 70 of the connector housing 10. As shown in FIG. 8, the connector housing 10 can be firmly locked onto the terminal 100 such that it is not possible to unintentionally remove or unmate the connector housing 10 from the terminal 100. In order to unmate the connector housing 10, an operator might have to first move or slide the unlocking element 90 from the position shown in FIG. 8 in mating direction into the second position. In the second position, the inner surface of the unlocking element 90 will elastically deflect the latch arms 70 into an unlocked position, from which it is possible to remove connector housing 10 from terminal 100.

It will be understood that the connector assemblies described herein can be suitable for various technical applications, for instance applications in which optical, optoelectric, or electric signals are transmitted. In particular, it will further be understood that the above-described connector assemblies are appropriate for an optical wave guide at least because the latch arms and the unlocking elements are part of the connector assembly itself, which can reduce the design requirements for complementary terminals significantly. Further, as described above, the unlocking elements can include significant parts of the locking tabs such that negative environmental impacts, for instance water, dirt, mechanical impact and the like, are avoided.

As described above, the connector assemblies, such as the connector assembly 1, can be unlocked from the terminal 100 by a linear movement of the unlocking element from the first position to the second position, for instance by a movement along the axis of the mating direction. Thus, no rotatory movement of the connector assembly is necessary and it is possible to use non-rotatory-symmetric connector assemblies. Thus, it is also possible to use the connector assembly with multi-mode cables, in which more than one optical signal is transmitted. Multi-cables can end up in a ferrule, which can define a rectangular shape.

As described above, the unlocking element can include a cylindrical bushing adapted to be slid over the connector housing. This can be advantageous because a significant portion of the connector assembly, which can protrude from the terminal when the connector assembly is mated with the terminal, can be protected by the cylindrical bushing. Thus, no highly complex movements have to be carried out in order to unlock the connector, which is particularly advantageous for applications in which a user has to work without direct view of the connector assembly and the terminal, for instance in example server racks.

It will be appreciated that the expressions left, right, up or down that may be used in the present description are only for illustrative purposes, since the shown embodiments of connector assemblies can be arranged in any spatial orientation.

The embodiments described in connection with the illustrated embodiments have been presented by way of illustration, and the present invention is therefore not intended to be limited to the disclosed embodiments. Furthermore, the structure and features of each the embodiments described above can be applied to the other embodiments described herein, unless otherwise indicated. Accordingly, the invention is intended to encompass all modifications and alternative arrangements included within the spirit and scope of the invention, for instance as set forth by the appended claims.

What is claimed:

1. A connector assembly comprising:
    a dielectric connector housing comprising a housing body comprising a mating end configured to mate with a complementary electrical component along a mating direction and a mounting end opposite the mating end;
    at least one latch arm supported by the housing body, each latch arm of the at least one latch arm comprising:
        a respective outer surface and an opposed respective inner surface that faces an outer surface of the housing body,
        a respective push tab supported by the respective outer surface of the at least one latch arm, and
        a respective locking tab supported by the respective outer surface of the at least one latch arm; and
    an unlocking element supported by the housing body, the unlocking element comprising an inner surface that faces the respective outer surface of each latch arm of the at least one latch arm,
    wherein movement of the unlocking element from a first position to a second position causes each latch arm of the at least one latch arm to deflect from a locked position to an unlocked position.

2. The connector assembly as recited in claim 1, wherein the movement of the unlocking element from the first position to the second position is along the mating direction.

3. The connector assembly as recited in claim 1, wherein the first position is disposed closer to the mating end as compared to the second position.

4. The connector assembly as recited in claim 1, wherein the second position is disposed closer to the mating end as compared to the first position.

5. The connector assembly as recited in claim 1, wherein surface of the unlocking element does not engage any push tab when the unlocking element is in the first position.

6. The connector assembly as recited in claim 1, wherein the inner surface of the unlocking element abuts each respective push tab when the unlocking element is in the second position.

7. The connector assembly as recited in claim 1, further comprising at least one spring element that biases the unlocking element in the first position.

8. The connector assembly as recited in claim 7, wherein the at least one spring element includes at least one spring that is less compressed when the unlocking element is in the second position as compared to when the unlocking element is in the first position.

9. The connector assembly as recited in claim 7, wherein the at least one spring element includes a first and second arm spaced apart from each other along a lateral direction to create a slot, and a wedge-shaped structure that is at least partially received by the slot such that the wedge-shaped structure causes the first and second arms to bend away from each other as the unlocking element is moved from the first position to the second position.

10. The connector assembly as recited in claim 1, wherein the at least one latch arm is elongated along the mating direction.

11. The connector assembly as recited in claim 1, wherein the connector housing comprises a cavity, and the movement of the unlocking element causes the at least one latch arm to deflect at least partially into the cavity.

12. The connector assembly as recited in claim 1, wherein the at least one latch arm is hinged to the connector housing proximate to the mounting end.

13. The connector assembly as recited in claim 1, wherein each locking tab comprises a height measured in a lateral direction that is substantially perpendicular to the mating direction, the height increasing along a direction from the mating end to the mounting end.

14. The connector assembly as recited in claim 1, wherein the at least one latch arm comprises a first latch arm and a second latch arm spaced from the first latch arm along a direction that is substantially perpendicular to the mating direction.

15. The connector assembly as recited in claim 14, wherein the movement of the unlocking element causes the first latch arm and the second latch arm to deflect toward each other.

16. The connector assembly as recited in claim 1, wherein the connector assembly is a plug connector configured to mate with a complementary terminal of the complementary electrical component and establish an optical connection between the connector assembly and the complementary electrical component.

17. A connector assembly comprising:
    a dielectric connector housing comprising a housing body comprising a mating end configured to mate with a complementary electrical component along a mating direction and a mounting end opposite the mating end;
    at least one latch arm supported by the housing body; each latch arm of the at least one latch arm comprising an outer surface and an opposed inner surface that faces an outer surface of the housing body;
    an unlocking element supported by the housing body, the unlocking element comprising an inner surface that faces the outer surface of the at least one latch arm; and
    at least one spring element that biases the unlocking element in a first position with respect to the connector housing, thereby biasing the at least one latch arm in a locked position, wherein the at least one spring element comprises a first arm and second arm spaced apart from each other along a lateral direction substantially perpendicular to the mating direction to create a slot that at least partially receives a wedge-shaped structure, further wherein the wedge-shaped structure causes the first and second arms to bend away from each other as the unlocking element is moved from the first position to a second position.

18. The connector assembly as recited in claim 17, wherein movement of the unlocking element from the first position to the second position causes the at least one latch arm to deflect from the locked position to an unlocked position.

19. The connector assembly as recited in claim 17, wherein the at least one spring element includes at least one spring that is less compressed when the unlocking element is in the second position as compared to when the unlocking element is in the first position.

20. A method of unmating a connector assembly that includes a 1) a first and second latch arm spaced from each other and supported by a housing body, the first and second latch arms each defining an outer surface and an opposed inner surface that faces a respective outer surface of the housing body, 2) an unlocking element supported by the housing body, the unlocking element comprising an inner surface that faces the outer surface of the first latch arm and the second latch arm, 3) a mating end configured to mate with a complementary electrical component, and 4) a mounting end opposite the mating end, the method comprising:

moving the unlocking element from a first position to a second position along a mating direction that extends from the mounting end toward the mating end, wherein the second position is disposed further along the mating direction as compared to the first position; and during the moving step, engaging, using the unlocking element, the first latch arm and second latch arm to deflect toward each other until the first latch arm and second latch arm are in an unlocked position.

21. The method as recited in claim 20, the method further comprising removing a force that moved the unlocking element from the first position to the second position such that the unlocking element returns to the first position.

\* \* \* \* \*